US009470469B2

(12) United States Patent
Daniel et al.

(10) Patent No.: US 9,470,469 B2
(45) Date of Patent: Oct. 18, 2016

(54) SYSTEMS AND METHODS FOR PROVIDING A SEAL BETWEEN A BOLT CARRIER AND A BOLT CARRIER GAS KEY OF A FIREARM

(71) Applicant: Daniel Defense, Inc., Black Creek, GA (US)

(72) Inventors: Marvin C. Daniel, Pooler, GA (US); Clinton Wade Lynch, Irmo, SC (US)

(73) Assignee: Daniel Defense, Inc., Black Creek, GA (US)

( * ) Notice: Subject to any disclaimer, the term of this patent is extended or adjusted under 35 U.S.C. 154(b) by 0 days.

(21) Appl. No.: 14/952,106

(22) Filed: Nov. 25, 2015

(65) Prior Publication Data

US 2016/0178308 A1     Jun. 23, 2016

Related U.S. Application Data

(60) Provisional application No. 62/093,767, filed on Dec. 18, 2014.

(51) Int. Cl.
| | | |
|---|---|---|
| *F41A 5/00* | (2006.01) | |
| *F41A 35/00* | (2006.01) | |
| *F41A 5/20* | (2006.01) | |
| *F16J 15/08* | (2006.01) | |
| *F16J 15/10* | (2006.01) | |
| *F41A 3/36* | (2006.01) | |
| *F41A 5/24* | (2006.01) | |

(52) U.S. Cl.
CPC ............... *F41A 35/00* (2013.01); *F16J 15/08* (2013.01); *F16J 15/104* (2013.01); *F41A 3/36* (2013.01); *F41A 5/20* (2013.01); *F41A 5/24* (2013.01)

(58) Field of Classification Search
CPC ............ F41A 35/00; F41A 5/20; F41A 3/36; F41A 5/24; F16J 15/08; F16J 15/104
USPC .......................................................... 89/193
See application file for complete search history.

(56) References Cited

U.S. PATENT DOCUMENTS

| | | | | |
|---|---|---|---|---|
| 4,244,273 A | * | 1/1981 | Langendorfer, Jr. | ...... F41A 5/28 89/193 |
| 5,351,598 A | * | 10/1994 | Schuetz | .................... F41A 5/18 42/25 |
| 7,316,091 B1 | | 1/2008 | Desomma | |
| 7,784,211 B1 | * | 8/2010 | Desomma | ................. F41A 3/26 42/16 |
| 8,166,864 B2 | * | 5/2012 | Herring | ..................... F41A 5/18 89/191.02 |
| 8,375,616 B2 | | 2/2013 | Gomez et al. | |
| 8,746,125 B2 | | 6/2014 | Gomez et al. | |
| 8,991,295 B2 | * | 3/2015 | Larue | ........................ F41A 5/24 42/16 |
| 2008/0276797 A1 | * | 11/2008 | Leitner-Wise | ............ F41A 3/12 89/191.01 |
| 2014/0190344 A1 | * | 7/2014 | Kenney | ..................... F41A 5/28 89/193 |
| 2014/0318361 A1 | * | 10/2014 | Larue | ........................ F41A 5/24 89/193 |

* cited by examiner

*Primary Examiner* — Michelle R Clement
(74) *Attorney, Agent, or Firm* — Sutherland Asbill & Brennan LLP

(57) ABSTRACT

An assembly for preventing gas leaks in a bolt carrier group of a firearm is disclosed. The assembly may include a bolt carrier with a gas hole, a bolt carrier gas key attachable to the bolt carrier about the gas hole, a groove disposed on the bolt carrier about the gas hole, and a seal disposed within the groove.

17 Claims, 2 Drawing Sheets

SYSTEMS AND METHODS FOR PROVIDING A SEAL BETWEEN A BOLT CARRIER AND A BOLT CARRIER GAS KEY OF A FIREARM

CROSS-REFERENCE TO RELATED APPLICATIONS

The disclosure claims priority to and the benefit of U.S. provisional application No. 62/093,767, filed Dec. 18, 2014, which is herein incorporated by reference in its entirety.

FIELD OF THE DISCLOSURE

The disclosure generally relates to firearms and more particularly relates to systems and methods for providing a seal between a bolt carrier and a bolt carrier gas key of a firearm.

BACKGROUND

A typical AR-15 bolt carrier group relies on precision manufacturing and assembly to ensure the proper flow of gas within the firearm. Any deviation (such as mismatched parts, flaws in mating surfaces, and/or debris introduced during assembly or operation of the firearm) can result in the loss of gas through the firearm.

Some attempts have been made to improve gas sealing in critical areas of the firearm using a painted on sealing media. While somewhat effective, the sealing media is typically painted on by hand, resulting in inconsistent coverage from part to part.

SUMMARY

Some or all of the above needs and/or problems may be addressed by certain embodiments of the disclosure. In an embodiment, an assembly for preventing gas leaks in a bolt carrier group of a firearm is disclosed. The assembly may include a bolt carrier with a gas hole, a bolt carrier gas key attachable to the bolt carrier about the gas hole, a groove disposed on the bolt carrier about the gas hole, and a seal disposed within the groove.

Other features and aspects of the disclosure will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
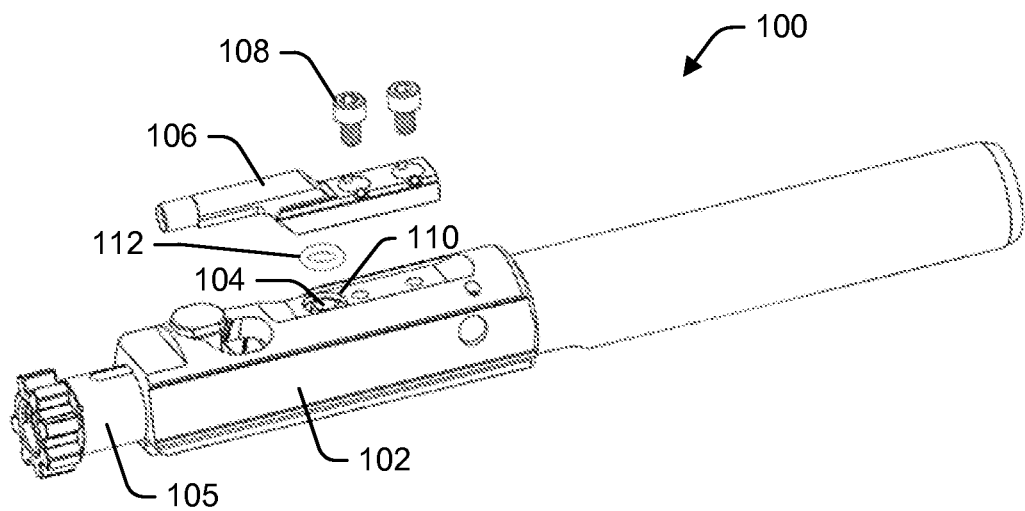
FIG. 1 depicts a perspective view of a bolt carrier group in accordance with one or more embodiments of the disclosure.

Described below are embodiments of systems and methods for providing a seal between a bolt carrier and a bolt carrier gas key of a firearm. Methods of manufacturing, using, and installing the seal are also disclosed. The firearm may be a conventional firearm. For example, the firearm may be an M-16 style rifle, an AR-15 style rifle, an AR-10 style rifle, or an M-4 style rifle, among others. Any type of firearm (including rifles, handguns, shotguns, or the like) may be used.

Generally speaking, one or more components of a bolt carrier group of a firearm are disclosed. The bolt carrier group may include a bolt carrier with a gas hole, a bolt carrier gas key attachable to the bolt carrier about the gas hole, a groove disposed on the bolt carrier about the gas hole, and a seal disposed within the groove. In some instances, the groove may comprise a circular groove disposed on a surface of the bolt carrier about the gas hole, and the seal may comprise a gasket, such as an O-ring. Other shaped groves and rings are contemplated (e.g., triangular, rectangular, etc.). The seal may be rubber, a metallic, a ceramic, a plastic, a synthetic, or a combination thereof. For example, in some instances, the seal may be brass, titanium, steal, copper, etc. The seal may be any suitable material or configuration.

The bolt carrier gas key may be attached to the bolt carrier by way of at least one screw. In some instances, two screws may be used. As the at least one screw is tightened, the seal (which in some instances may be slightly larger than the groove) may be compressed at least partially within the groove between the bolt carrier and the bolt carrier gas key to form a gap-filling barrier around the gas hole. In this manner, a seal may be provided around the gas hole between the bolt carrier and the bolt carrier gas key to prevent the leakage of gas therebetween. In some instances, the seal may be semi-malleable, temperature resistant, and act to mitigate gas leakage due to, e.g., improper part mating.

The groove and seal may be incorporated into any new or off-the-shelf bolt carrier group. For example, the groove may be machined into the bolt carrier of an off-the-shelf firearm. The groove may at least partially receive the seal (e.g., an O-ring) between the bolt carrier and the bolt carrier gas key. That is, the O-ring may be placed into the machined circular groove of the bolt carrier, and the bolt carrier gas key may then be installed using one or more screws (or other fasteners). When the screws are tightened, compression may be imparted on the seal, causing it to distort at least partially within the groove and around the gas hole to form a gap-filling barrier that eliminates unwanted gas leakage from the gas hole between the bolt carrier and the bolt carrier gas key.

The seal provides several technical advantages and/or solutions. For example, the groove may be easily machined using conventional and available tooling. Moreover, any conventional seal, such as an O-ring or the like may be used. The seal provides improved reliability. However, in the event the seal fails, the bolt carrier group will continue to function in the standard, current convention.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Figure 2:
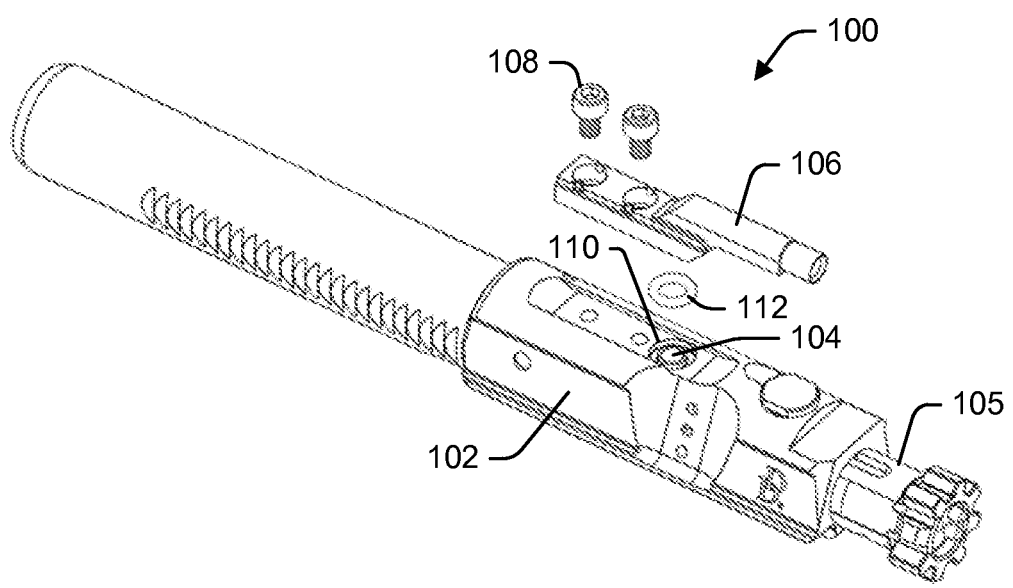
FIG. 2 depicts a perspective view of a bolt carrier group in accordance with one or more embodiments of the disclosure.
Figure 3:
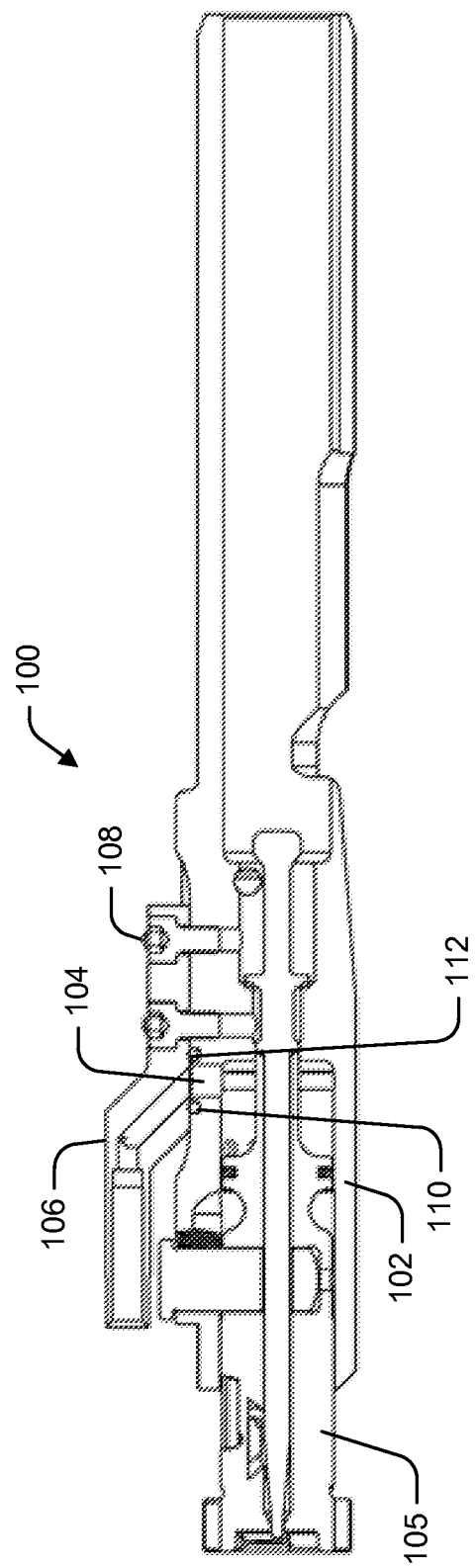
FIG. 3 depicts a cross-sectional view of a bolt carrier group in accordance with one or more embodiments of the disclosure.

FIGS. 1-3 depict a bolt carrier group 100 for a firearm in accordance with one or more embodiments of the disclosure. The bolt carrier group 100 may include a bolt carrier 102 and a bolt 105. The bolt carrier 102 may include a gas hole 104 for the passage of gas therethrough. The bolt carrier group 100 also may include a bolt carrier gas key 106 attachable to the bolt carrier 102 about the gas hole 104. For example, at least one screw 108 may be used to fasten the bolt carrier gas key 106 to the bolt carrier 102. In some instances, two screws 108 may be used. The gas hole 104 and the bolt carrier gas key 106 may be in fluid communication with one another such that the gas from the discharge of the firearm may pass from the gas tubes (not shown), through the bolt carrier gas key 106, and into the bolt carrier 102 by way of the gas hole 104.

In order to form a seal about the gas hole 104 between the bolt carrier 102 and the bolt carrier gas key 106, a groove 110 may be disposed on a surface of the bolt carrier 102 about the gas hole 104. The groove 110 may be machined or casted into the surface of the bolt carrier 102. In some instances, the groove 110 may comprise a circular groove disposed on the bolt carrier 102 about the gas hole 104. In some further instances, the groove 110 may comprise a rectangular groove (not shown) disposed on the bolt carrier 102 about the gas hole 104. A seal 112 may be at least partially disposed within the groove 110. In some instances, the seal 112 may comprise an O-ring or other gasket. The O-ring may be rubber or a metallic. The seal 112 may be any suitable material and any shape.

As the at least one screw 108 is tightened, the seal 112 (which in some instances may be slightly larger than the groove 110) may be compressed at least partially within the groove 110 between the bolt carrier 102 and the bolt carrier gas key 106 to form a gap-filling barrier around the gas hole 104. In this manner, a seal may be provided around the gas hole 104 between the bolt carrier 102 and the bolt carrier gas key 106 to prevent the leakage of gas therebetween.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An assembly for preventing gas leaks in a bolt carrier group of a firearm, the assembly comprising:
    a bolt carrier with a gas hole;
    a bolt carrier gas key attachable to the bolt carrier about the gas hole;
    an O-ring groove disposed on the bolt carrier about the gas hole, wherein the O-ring groove comprises a circular groove disposed on the bolt carrier about the gas hole; the O-ring groove having a larger inside diameter than an outside diameter of the gas hole and
    a seal disposed within the O-ring groove, wherein the seal comprises an O-ring substantially conforming to a size, shape, and dimension of the O-ring groove.

2. The assembly of claim 1, wherein the bolt carrier gas key has a substantially flat gas key surface adjacent to the gas hole whereby the gas key surface compresses the O-ring against the walls of the O-ring groove.

3. The assembly of claim 1, wherein the O-ring comprises rubber.

4. The assembly of claim 1, wherein the O-ring comprises a metallic.

5. The assembly of claim 1, wherein the bolt carrier gas key is attachable to the bolt carrier by way of at least one screw.

6. The assembly of claim 5, wherein as the at least one screw is tightened, the seal is compressed within the O-ring groove between the bolt carrier and the bolt carrier gas key to form a gap-filling barrier therebetween.

7. A method for providing an O-ring seal between a bolt carrier with a gas hole and a bolt carrier gas key of a firearm, the method comprising:
    machining a circular O-ring groove on the bolt carrier about the gas hole, the O-ring groove having a larger inside diameter than an outside diameter of the gas hole;
    positioning the O-ring seal within the O-ring groove, wherein the O-ring seal comprises an O-ring substantially conforming to a size, shape, and dimension of the O-ring groove; and
    attaching the bolt carrier gas key to the bolt carrier.

8. The method of claim 7, wherein the bolt carrier gas key has a substantially flat gas key surface adjacent to the gas hole whereby the gas key surface compresses the O-ring against the walls of the O-ring groove.

9. The method of claim 7, wherein the O-ring comprises rubber.

10. The method of claim 7, wherein the O-ring comprises a metallic.

11. The method of claim 7, wherein the bolt carrier gas key is attached to the bolt carrier by way of at least one screw.

12. The method of claim 11, wherein as the at least one screw is tightened, the seal is compressed within the O-ring groove between the bolt carrier and the bolt carrier gas key to form a gap-filling barrier therebetween.

13. A bolt carrier group of a firearm, comprising:
    a bolt carrier with a gas hole;
    a bolt carrier gas key attachable to the bolt carrier about the gas hole;

an O-ring groove disposed on the bolt carrier about the gas hole, wherein the O-ring groove comprises a circular groove disposed on the bolt carrier about the gas hole, the O-ring groove having a larger inside diameter than an outside diameter of the gas hole; and a seal disposed within the O-ring groove, wherein the seal comprises an O-ring substantially conforming to a size, shape, and dimension of the O-ring groove.

14. The bolt carrier group of claim 13, wherein the bolt carrier gas key has a substantially flat gas key surface adjacent to the gas hole whereby the gas key surface compresses the O-ring against the walls of the O-ring groove.

15. The bolt carrier group of claim 14, wherein the O-ring comprises rubber or a metallic.

16. The bolt carrier group of claim 13, wherein the bolt carrier gas key is attachable to the bolt carrier by way of at least one screw.

17. The bolt carrier group of claim 16, wherein as the at least one screw is tightened, the seal is compressed within the O-ring groove between the bolt carrier and the bolt carrier gas key to form a gap-filling barrier therebetween.

* * * * *